(12) United States Patent
Nicodemus

(10) Patent No.: US 6,311,472 B1
(45) Date of Patent: Nov. 6, 2001

(54) METHOD AND MEANS OF FLUID SUPPLY FOR COMBUSTION SYSTEMS

(75) Inventor: Mark Nicodemus, Leroy, NY (US)

(73) Assignee: Helios Energy Technologies, Inc., Leroy, NY (US)

( * ) Notice: Subject to any disclaimer, the term of this patent is extended or adjusted under 35 U.S.C. 154(b) by 0 days.

(21) Appl. No.: 09/289,895

(22) Filed: Apr. 12, 1999

(51) Int. Cl.[7] .................................................. F02C 7/26
(52) U.S. Cl. ...................... 60/39.06; 60/39.05; 60/39.3; 60/39.182; 417/54
(58) Field of Search .................... 60/39.05, 39.06, 60/39.182, 39.3; 417/54

(56) References Cited

U.S. PATENT DOCUMENTS

| | | | |
|---|---|---|---|
| 4,673,335 | * | 6/1987 | Nicodemus ........................ 417/54 |
| 5,586,442 | * | 12/1996 | Nicodemus ........................ 62/107 |
| 5,617,716 | * | 4/1997 | Schreiber et al. ................ 60/39.05 |
| 5,983,622 | * | 11/1999 | Newburry et al. ................ 60/39.05 |

* cited by examiner

Primary Examiner—Charles G. Freay
Assistant Examiner—E D Hayes
(74) Attorney, Agent, or Firm—Robert J. Bird

(57) ABSTRACT

A combustion system includes a combustor and a hydrokinetic amplifier to supply it with fluids. The hydrokinetic amplifier includes first and second primary fluid inlet ports to receive first and second primary fluids into the hydrokinetic amplifier at a relatively low pressure, and a discharge port to discharge the combined first and second fluids at a higher pressure to the combustor. The primary fluids are air, water, steam, or fuel, at least one of which includes gas/vapor phase fluid. The hydrokinetic amplifier may include one or more auxiliary inlet ports to receive auxiliary input fluid (air, water, steam, or fuel) into the hydrokinetic amplifier for combination with the primary fluids.

13 Claims, 3 Drawing Sheets

METHOD AND MEANS OF FLUID SUPPLY FOR COMBUSTION SYSTEMS

TECHNICAL FIELD

This invention relates to methods and apparatus for supplying liquid or gaseous fuels to combustion apparatus of power generating systems utilizing the pumping and mixing capabilities of a hydrokinetic amplifier.

BACKGROUND OF THE INVENTION

A gas turbine requires its fuel to be pumped or compressed to sufficient pressure for injection into the combustion chamber. Combustion chamber pressure, commonly in the range of 10 to greater than 20 atmospheres, is determined by air compressor discharge pressure and other turbine design parameters. Work required to operate the pumps and/or compressors reduces the net work output from the gas turbine cycle. In addition, water or steam is often introduced into the fuel or fuel/air combination within the combustor for NOx control, and/or increased work output from the turbine. Such added water or steam must also be at sufficient pressure for entrance into the combustor. Again, the work required to operate pumps and/or compressors for these fluids reduces the net work output from the gas turbine cycle. Also, the extraction of medium pressure steam from the steam side of a combined cycle reduces the net work output from the combined cycle power plant. These details add considerable complexity to system controls, and their capital equipment cost and ongoing operation and maintenance expenses are significant.

In addition to the pressurization requirement, fuel, air, and water streams must be properly mixed for proper combustion. Scores of existing patents addressing these issues are evidence of the intense and ongoing efforts within the industry to improve upon existing technologies.

U.S. Pat. No. 5,617,716 details a method of vaporizing liquid fuel oil and combining it with steam for combustion in a gas turbine system.

U.S. Pat. No. 5,054,279 describes a system wherein steam, water and fuel are combined with gas in a combustor and the steam/fuel ratio is greater than 2.75 to 1.

U.S. Pat. No. 4,110,973 involves a design for blending a homogeneous mixture of liquid fuel and water for delivery to a gas turbine engine.

U.S. Pat. No. 4,259,837 details a control system for mixing water and fuel in a proper proportion for a gas turbine power system.

U.S. Pat. No. 4,089,639 describes a system for mixing gaseous fuel, air, and water for combustion.

U.S. Pat. No. 5,816,041 details a venturi type mixing nozzle for a gas turbine engine wherein gaseous fuel, air and water are mixed prior to their injection into the combustor.

U.S. Pat. No. 3,921,389 involves a means for combustion of hydrocarbon fuel with air and water.

U.S. Pat. No. 3,741,712 details a supply system for burning of emulsions of water and hydrocarbon fuel.

SUMMARY OF THE INVENTION

A hydrokinetic amplifier (HA) combines two or more relatively low pressure fluid streams, and discharges the combined stream at elevated pressures to enter a gas turbine combustion chamber. In so doing, the HA also performs a mixing action, delivering highly emulsified and homogeneous fluid for efficient combustion and increased net work output from the system.

DRAWINGS

DETAILED DESCRIPTION

Figure 1:
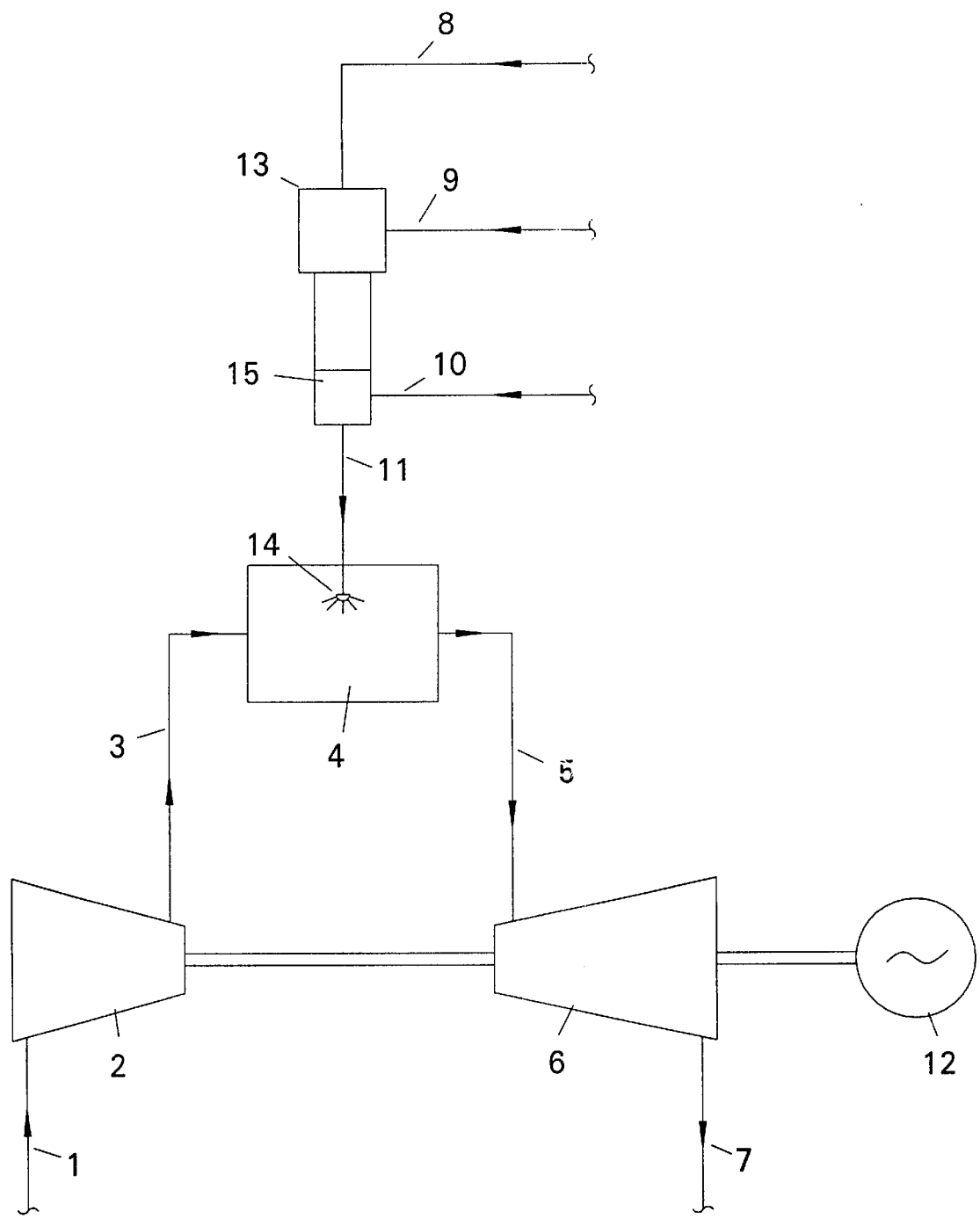
FIG. 1 is a schematic diagram of a gas turbine power system, including a hydrokinetic amplifier (HA) as liquid fuel pump and fuel/water mixer.

FIG. 1 depicts a simple gas turbine power cycle, including a hydrokinetic amplifier (HA) as fuel pump and fuel/water mixer. A compressor 2 takes in atmospheric air through a suction line 1 and delivers compressed air through a pressure line 3 to a combustor 4. An HA 13 receives water from a water feed line 8 and steam from a steam feed line 9 to produce a high velocity, heated liquid stream in a mixing zone 15. Hydrocarbon fuel, which might be liquid (such as distillate oil #2) or gas (such as natural gas) enters the mixing zone 15 through a fuel feed line 10. Fuel combines with the water stream in the mixing zone 15, and exits the HA 13 through a fluid discharge line 11 as a high pressure, homogeneous mixture suitable for combustion. The composite stream enters the combustor 4 through an atomizing or other suitable nozzle 14 for combustion in the presence of compressed air entering from the pressure line 3. Humidified combustion gases at high temperature and pressure exit the combustor 4 through a gas turbine inlet line 5. The gas turbine 6 expands the combustion gas products to produce shaft work which drives the compressor 2 and an electical generator 12. Hot exhaust gases leave the gas turbine 6 at low pressure through an exhaust line 7 to a stack and to atmosphere, or to a heat recovery system such as a boiler in a combined cycle plant (not shown).

Conventional gas turbine systems require that fuel, whether liquid or gas, be brought up to pressures sufficient for injection into the combustor, which is typically at about 150 to greater than 300 psia. In the prior art, a standard mechanical fuel oil pumping system or, in the case of gaseous fuel a gas compressor system, is used for this purpose. Considerable work is extracted from the plant to operate these high power components, significantly reducing net work output from the power plant system. Furthermore, these rotary (or reciprocating) components are high maintenance items, subject to leakage and excessive downtime.

In addition to fuel pressurization, many systems also require pumps, at a cost of considerable energy, to boost water pressure to these same levels for injection into the combustor. And, if steam is used, it must be extracted from a relatively high pressure source. This is a wasteful use of high pressure, high temperature steam.

My improvement to the gas turbine system includes the use of the HA as a fuel pump and/or compressor as well as a pump for injecting pressurized and heated water into the working fluid stream. If steam is used as the working vapor in the HA, it can be drawn from a source of significantly lower pressure than the operating pressure of a compressor/combustor/turbine inlet train.

Referring still to FIG. 1, assume for example that compressor discharge in the pressure line 3 is at 294 psia (20 atmospheres). The pressure in the fluid discharge line 11 to the combustor 4 must also be at least 20 atmospheres. The HA 13 produces a stream in the discharge line 11 at pressures greater than 300 psia, even though it is supplied with primary water and steam at less than 40 and 60 psia, respectively. Thus, if the steam source is an extraction turbine (in a combined cycle or cogeneration system), the steam feed line 9 can be extracted from the turbine at a much lower pressure bleed point than would be possible without the HA. In other words, in this example, steam can be extracted from the turbine at 60 psia instead of 294 psia. This allows for a significantly greater enthalpy drop through the steam turbine and therefore greater gross work output. Suitable water/fuel ratios can be created by optimizing flow rates and pressures. Fuel feed line 10 can deliver the desired amount of combustible fuel to be blended with the motivating fluid stream combined from lines 8 and 9. The fuel in fuel feed line 10 can also be at relatively low pressure, less than 100 psi for example, and yet it will be accelerated in mixing zone 15 and then decelerated and converted to high pressure in the HA diffuser. Highly efficient blending is accomplished simultaneously with pressurization.

Figure 2:
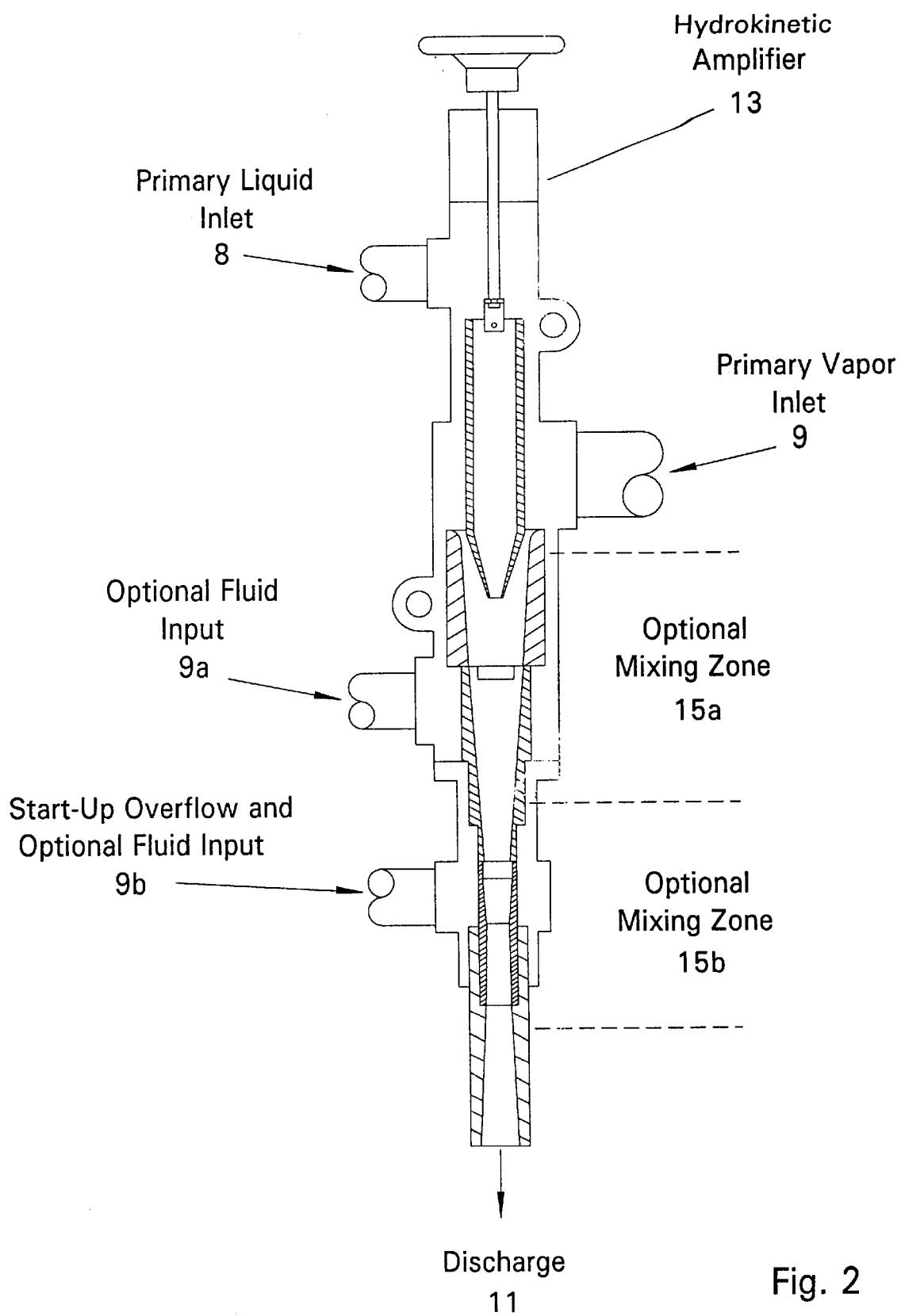
FIG. 2 is a cross-sectional view of an HA for pumping and mixing three or more fluid streams.

FIG. 2 details the internal cross-section of one version of the HA, such as described in U.S. Pat. No. 4,569,635. Other versions of the HA, such as described in U.S. Pat. Nos. 4,673,335; 4,781,537; and 5,794,447 have similar configurations and also produce elevated pressure discharge streams relative to their supply streams. HA 13 receives primary liquid from a water feed line 8, and primary vapor from a steam feed line 9. The combined streams accelerate and move toward the discharge line 11. The HA 13 may further include a third inlet port 9a for air, water, steam, or fuel (or combinations of these) to combine with primary liquid and vapor in a second mixing zone 15a. Similarly, the HA 13 may still further include a fourth inlet port 9b for air, water, steam, or fuel (or combinations of these) to combine with the fluid stream in a third mixing zone 15b.

FIGS. 3–6 depict a series of HA supply stream configurations to illustrate various possible arrangements for a HA fluid delivery system to a gas turbine combustor. To help convey the versatility and tolerance of the hydrokinetic amplifier, the following description will give a breakdown of sample material balances around the device on a mass fraction basis. Discharge streams F, K, Q, and W are each composite blends of the sum total (equal to 1.00) of inlets to the respective HA's.

Figure 3:
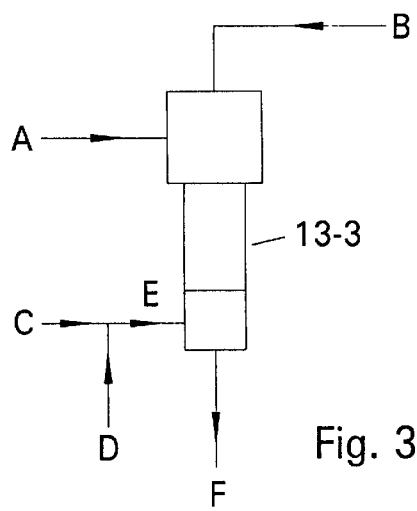
FIGS. 3, 4, 5, 6 show the HA with various combinations of supply and discharge streams.

In FIG. 3, the HA 13-3 receives 0.06 steam from line A and 0.60 water at B. Line C delivers 0.3 fuel oil to combine with 0.04 air from D (ambient or compressed) to enter the HA at E. The combined mass of inputs at A, B, E is pressurized and discharged at F with a mass value of 1.00.

Figure 4:
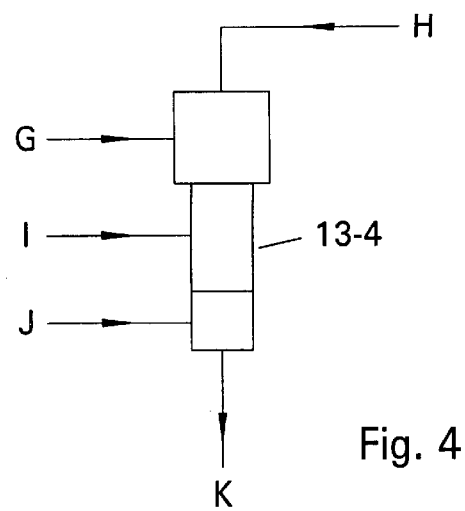

In FIG. 4, the HA 13-4 receives 0.08 steam from line G; 0.60 liquid fuel at H; 0.05 water at I; and 0.27 compressed air at J. The combined mass of inputs at G, H, I, J is pressurized and discharged at K with a mass value of 1.00.

Figure 5:
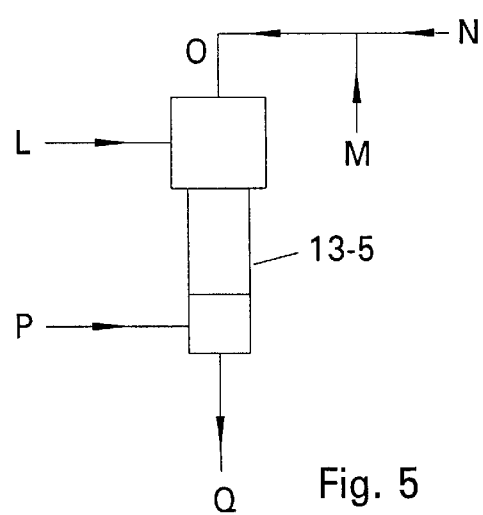

In FIG. 5, the HA 13-5 receives 0.1 steam from line L; 0.88 water and fuel at O (blended from 0.44 water at N and 0.44 fuel oil at M); and 0.02 air at P. The combined mass of inputs at L, O, P is pressurized and discharged at Q with a mass value of 1.00. The discharge is a highly emulsified blend of liquid and 2% compressed, non-condensable air. This pressurized mixture is delivered through an atomizing nozzle into a turbine combustor.

Figure 6:
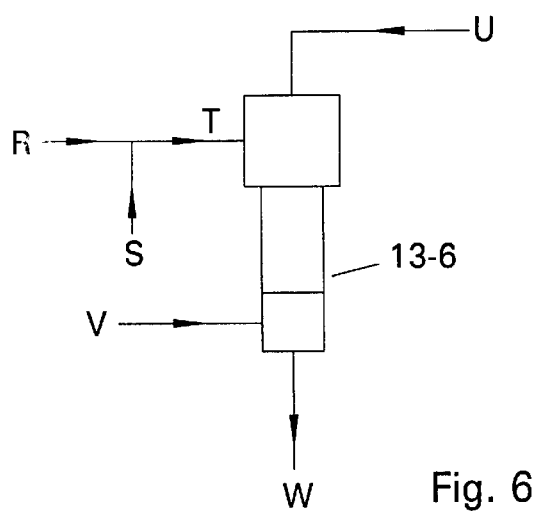

Experimentation and development of the HA over the years has demonstrated its extraordinary ability to operate satisfactorily under a variety of supply conditions. Combining a non-condensable such as air (or gaseous fuel) with steam before entering the HA is one noteworthy example. While the impressive pressure boosting ability of the HA relies upon a condensable expanding vapor, the tolerance of the HA for surprisingly high ratios of non-condensables in the vapor supply offers additional blending possibilities. In FIG. 6, the HA 13-6 receives 0.7 water from line U; 0.23 steam and gaseous fuel at T (blended from 0.15 steam at R and 0.08 gaseous fuel, such as natural gas, at S); and 0.07 air at V. The combined mass of inputs at T, U, V is pressurized and discharged at W with a mass value of 1.00 to a gas turbine combustor (not shown).

An added and significant benefit of my invention is that the latent heat of condensation in the HA motivating vapor provides considerable preheating of the entire fuel mix stream on its way to the combustor.

The preceding examples are illustrative of only a few of many possible arrangements where an HA is used as a pump/mixer for a gas turbine system. Mass flow ratios of the constituent streams recited above are also only illustrative.

What is claimed is:

1. A combustion system including a combustor and a hydrokinetic amplifier operatively connected to said combustor;

said hydrokinetic amplifier including a first primary fluid inlet port to receive a first primary fluid into said hydrokinetic amplifier at a first pressure, a second primary fluid inlet port to receive a second primary fluid into said hydrokinetic amplifier at a second pressure, and a discharge port to discharge a liquid phase combination of said first and second fluids at a third pressure, greater than said first and second pressures, to said combustor, said primary fluids selected from the group consisting of air, water, steam, and fuel.

2. A combustion system as defined in claim 1, said hydrokinetic amplifier further including:

a first auxiliary inlet port to receive a first auxiliary input fluid into said hydrokinetic amplifier for combination therein with said primary fluids.

3. A combustion system as defined in claim 2 wherein said auxiliary input fluid is selected from the group consisting of air, water, steam, fuel, and combinations thereof.

4. A combustion system as defined in claim 2, said hydrokinetic amplifier further including:

a second auxiliary inlet port to receive a second auxiliary input fluid into said hydrokinetic amplifier for combination therein with fluids entering said hydrokinetic amplifier upstream of said second auxiliary inlet port.

5. A combustion system as defined in claim 4 wherein said auxiliary input fluids are selected from the group consisting of air, water, steam, fuel, and combinations thereof.

6. A combustion system, including:

a combustor; and a hydrokinetic amplifier adapted to receive primary motive fluids and secondary input fluids for combination with said primary fluids;

said hydrokinetic amplifier effective to combine said fluids, and to discharge a liquid phase combination of said combined fluids under pressure to said combustor.

7. A combustion system, including:

a hydrokinetic amplifier to receive liquid and gas phase fuels at first and second pressures, to combine said fuels, and to discharge a liquid phase combination of said fuels at a third pressure, higher than said first and second pressures; and a combustor to receive said combined fluids from said hydrokinetic amplifier for combustion in said combustor.

8. A method of preheating liquid fuel for a combustor by passing said fuel through a hydrokinetic amplifier for direct contact therein with steam, condensing said steam in said hydrokinetic amplifier, generating a homogeneous liquid phase mixture of said fuel and said condensed steam in said hydrokinetic amplifier, and discharging said liquid phase mixture to said combustor.

9. A gas turbine system including a combustor to generate combustion gases, and a hydrokinetic amplifier to receive input fluids, to combine said input fluids, and to discharge a liquid phase combination of said combined fluids under pressure to said combustor, said input fluids selected from the group consisting of air, water, steam, and fuel.

10. A gas turbine system including a compressor to generate compressed air; a combustor to receive said compressed air, to combust fuel therein, and to thereby generate hot combustion gases; a gas turbine to expand said combustion gases to generate shaft work; and the improvement including:

a hydrokinetic amplifier to receive input fluids and to blend, preheat, and increase the pressure of said input fluids to generate a pressurized fuel supply stream to said combustor;

said input fluids including two selected from the group consisting of air, water, steam, gaseous fuel, liquid fuel, and combinations thereof; at least one of said fluids being a condensible vapor, and at least one of said fluids being a fuel.

11. A gas turbine system as defined in claim 10, said fuel supply stream entering said combustor in a liquid phase.

12. A gas turbine system as defined in claim 10, said fuel supply stream entering said combustor as an emulsion of liquid and noncondensible gas.

13. A gas turbine system as defined in claim 10, said fuel supply stream entering said combustor including a humidified noncondensible fuel.

* * * * *